United States Patent [19]

Tanaka et al.

[11] Patent Number: 4,538,882
[45] Date of Patent: Sep. 3, 1985

[54] TWO-DIMENSIONAL SUSPENSION

[75] Inventors: Shinichi Tanaka, Kyoto; Namio Hirose, Hirakata, both of Japan

[73] Assignee: Matsushita Electric Industrial Co., Ltd., Osaka, Japan

[21] Appl. No.: 418,385

[22] Filed: Sep. 15, 1982

[30] Foreign Application Priority Data

Sep. 17, 1981 [JP] Japan .................. 56-147664

[51] Int. Cl.³ .................. F16F 1/18; F16F 15/06; G11B 7/08; G11B 17/32
[52] U.S. Cl. .................. 350/255; 248/630; 248/638; 267/160; 353/101
[58] Field of Search .................. 267/69, 47, 75, 137, 267/140.3, 140.4, 140.5, 141.1, 151, 158, 160, 182, 36 R, 41; 360/130.3, 130.31, 130.32; 188/378, 83, 379, 380; 248/627, 630, 638; 369/256; 271/273, 274; 350/255; 353/101

[56] References Cited

U.S. PATENT DOCUMENTS

| | | | |
|---|---|---|---|
| 1,433,246 | 10/1922 | Tacchi | 267/36 R |
| 2,503,714 | 4/1950 | Eagle et al. | 353/101 X |
| 2,534,722 | 12/1950 | Meiklejohn, Jr. et al. | 267/41 |
| 2,594,665 | 4/1952 | Lockwood | 267/36 R |
| 3,416,790 | 12/1968 | Davis | 271/273 |
| 3,429,566 | 2/1969 | Rosendale | 267/41 |
| 3,821,519 | 6/1974 | Pietenpol | 271/273 |
| 4,030,815 | 6/1977 | Andrevski et al. | 350/255 |
| 4,129,290 | 12/1978 | Popper | 267/160 |
| 4,291,350 | 9/1981 | King et al. | 360/130.3 |
| 4,293,885 | 10/1981 | Shirako et al. | 267/158 |

FOREIGN PATENT DOCUMENTS

| | | |
|---|---|---|
| 148502 | 8/1902 | Fed. Rep. of Germany . |
| 1025156 | 2/1958 | Fed. Rep. of Germany . |
| 2640691 | 6/1978 | Fed. Rep. of Germany . |
| 333525 | 12/1935 | Italy ............ 267/182 |
| 58-50336 | 3/1983 | Japan ............ 267/160 |
| 227397 | 1/1925 | United Kingdom ...... 267/36 R |
| 892694 | 3/1962 | United Kingdom . |

OTHER PUBLICATIONS

Sass et al., "Dubbel–Taschenbuch für den Maschinenbau", 1970, pp. 426–427.

Primary Examiner—Douglas C. Butler
Assistant Examiner—Richard R. Diefendorf
Attorney, Agent, or Firm—Wenderoth, Lind & Ponack

[57] ABSTRACT

A two-dimensional (2-D) suspension system consists of series of rhomboidal parallel leaf springs (RPLSs) each of which comprises plural leaf springs apart from one another and at least two rigid walls for fixing both ends of the leaf springs at the same fixing angle selected not to be a right angle and to be different from fixing angles of other rhomboidal parallel leaf springs. Plural rhomboidal parallel leaf springs are linked in series by connecting the rigid walls in such a way that faces of all the leaf springs are perpendicular to an imaginary plane. The 2-D suspension system suspends a movable body which is allowed translation in a plane only and which is restricted in other motions. The mass of the rigid body connecting two RPLSs is so small that the resonance of the rigid body hardly interferes with the motion of the movable body. The 2-D suspension system can hold the movable body at both sides thereof in symmetry. This symmetric 2-D suspension system is useful for a position control system, especially for an actuator of optical information read head which needs a tracking and focussing control of high precision without tilt of the optical axis.

2 Claims, 11 Drawing Figures

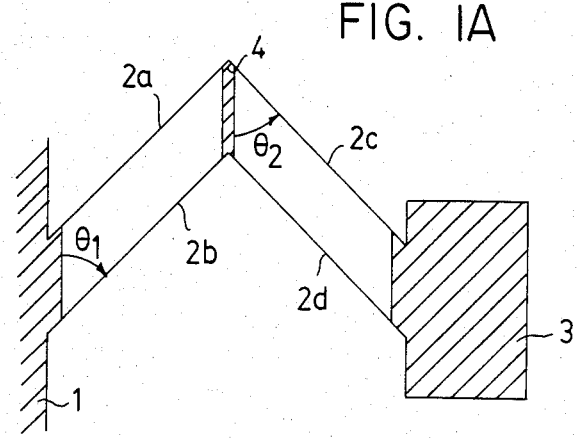
FIG. IA
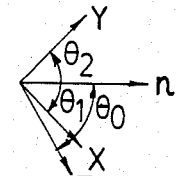
FIG. ID
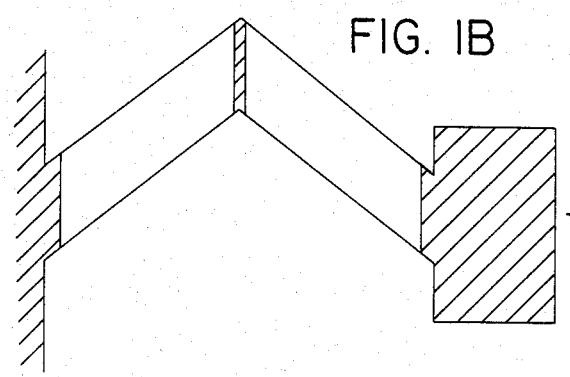
FIG. IB
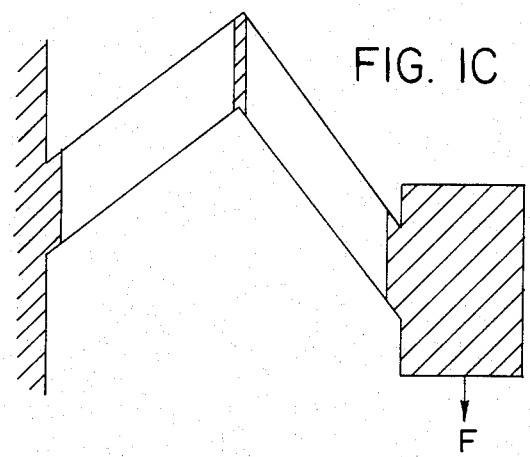
FIG. IC

TWO-DIMENSIONAL SUSPENSION

BACKGROUND OF THE INVENTION

1. Field of the Invention

This invention relates to a two-dimensional suspension for a movable body which translates in a plane.

2. Description of the Prior Art

A two-dimensional suspension (2-D suspension, hereafter) is useful for suspending a movable body which moves under a two-dimensional position control. Especially in an optical information read head, the movable body must be suspended without rotational fluctuation under the tracking and focussing control because the optical performance is reduced by a tilt of the optical axis caused by a rotational fluctuation of the movable body.

Conventionally, a parallel leaf spring is generally employed to suspend a movable body without rotation. The parallel leaf spring usually comprises two leaf springs of the same length and two rigid walls. Each of these rigid walls fixes the opposite ends of the leaf springs at a right angle apart from each other so as not to be on the same plane. In other words, the side view of the conventional parallel leaf spring is rectangular. One of the rigid walls is fixed to a fixing block, and the other is fixed to the movable body. The parallel leaf spring has a high compliance to a translation in a specified direction, and has a low compliance in other directions. Therefore, the parallel leaf spring is useful for suspending a movable body which translates in an arc without rotation. When a movable body translates in a plane, the movable body can be suspended by two conventional parallel leaf springs coupled in series.

The conventional 2-D suspension described above, however, has at least one of the defects as follows:

(i) The connecting member for connecting the parallel leaf springs is so heavy that its resonance interferes with the motion of the movable body;

(ii) The connection of the parallel leaf springs is complicated; and (iii) The movable body translates in a curved plane because the locus of the translation by the individual parallel leaf spring is an arc.

SUMMARY OF THE INVENTION

It is an object of the present invention to provide a 2-D suspension for a movable body, useful for a position control system, especially for an optical information read head system.

It is another object of the present invention to provide a 2-D suspension for a movable body, having high stability free from the interference of the resonance of the 2-D suspension.

It is still another object of the present invention to provide a 2-D suspension for a movable body, capable of holding the movable body at both sides thereof symmetrically, thereby obtaining high stability.

It is a further object of the present invention to provide a 2-D suspension for a movable body, having high mechanical strength, high thermal conductivity, and high stability.

A 2-D suspension of the present invention consists of series of rhomboidal parallel leaf springs. A rhomboidal parallel leaf spring (RPLS, hereafter) comprises plural leaf springs which are spaced apart from one another and two rigid walls for fixing both ends of each of the plural leaf springs at an angle not equal to a right angle. In other words, the side view of the RPLS is a rhomboid. One RPLS performs the same function as the conventional parallel leaf spring. Plural RPLSs are linked in series by connecting the rigid walls in such a way that the faces of all the leaf springs are perpendicular to an imaginary plane and the fixing angles of the leaf springs of the RPLS adjacent through the connecting rigid wall with respect thereto are different so as not to be arranged in a straight line. Since all the leaf springs of the RPLSs are normal to the imaginary plane, the locus of the translation of the movable body is a plane parallel to the imaginary plane.

The 2-D suspension of the present invention consists of at least two RPLSs linked in series. If the number of RPLSs linked in series increases, the size of the 2-D suspension can be reduced in one direction.

The RPLS has at least two leaf springs. If the number of leaf springs employed in the RPLS increases, the total cross section of the leaf springs increases in proportion to the number of leaf springs under a constant compliance and length. Therefore, it is useful to increase the number of leaf springs for increasing thermal conductivity and strength of the 2-D suspension of the invention.

Furthermore, the two-dimensional suspension of the invention can hold a movable body at its both sides in symmetry with respect to the center of gravity of the movable body without any restrictive force to each other by arranging the series of RPLSs at both sides of the movable body in such a way that the abovesaid imaginary planes are parallel with each other. This symmetric 2-D suspension is very practical because of its superior stability.

As briefly described above, a 2-D suspension, which is useful especially for a position control system, can be obtained according to the present invention.

The above and other objects, features and advantages of the present invention will become more apparent from the following detailed description prepared in accordance with the accompanying drawings.

BRIEF DESCRIPTION OF THE DRAWINGS

FIGS. 1(A), 1(B) and 1(C) show side cross sections of a two-dimensional suspension embodying the present invention with no external force applied in the drawing of FIG. 1(A), with an external force applied toward the right in the drawing of FIG. 1(B), and with an external force applied downward in the drawing of FIG. 1(C), respectively;

FIG. 1(D) shows a force diagram for the present invention shown in FIG. 1(A);

DETAILED DESCRIPTION OF THE PREFERRED EMBODIMENTS

Figure 2:
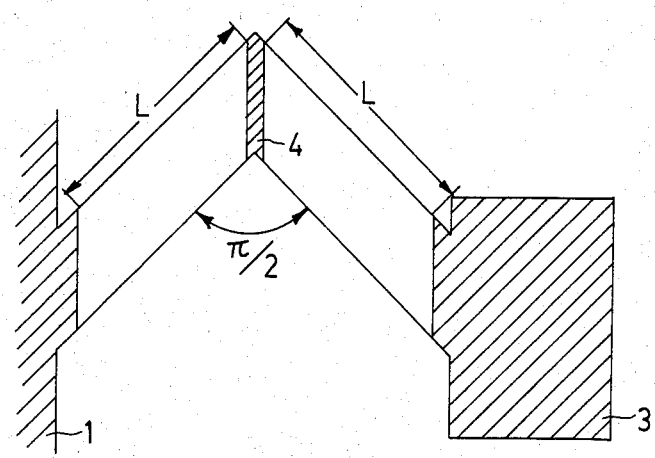
FIG. 2, FIG. 3, FIG. 4 and FIG. 5 show cross sections of other embodiments of the present invention.

FIG. 1(A) shows a side cross section view of a 2-D suspension comprising two RPLSs. The first RPLS consists of two leaf springs 2a and 2b of the same length, a rigid wall 4 and a fixing block 1 which functions as the other rigid wall. The second RPLS consists of two leaf springs 2c and 2d of the same length, the rigid wall 4 and a movable body 3 which functions as the other rigid wall. The fixing block 1 fixes one end of the leaf springs 2a and 2b at the same fixing angle $\theta_1$. The rigid wall 4 similarly fixes the other end of the leaf springs 2a and 2b. Then the first RPLS forms a rhomboid when no external force is applied. When an external force acts on the first RPLS, the leaf springs 2a and 2b are bent similarly, and the rigid wall 4 is translated as the conventional parallel leaf spring. Then the movable body 3 is translated in the direction of X indicated in the drawing of FIG. 1(D).

On the other hand, the movable body 3 and rigid wall 4 similarly fix leaf springs 2c and 2d at the same fixing angle $\theta_2$. When an external force acts on the second RPLS, the movable body 3 is translated in the direction of Y indicated in the drawing of FIG. 1(D) in such a manner as is mentioned above.

The individual RPLS translates the movable body in an arc, but not in a straight line. In spite of this non-linearity of the individual RPLS, the movable body is translated in a plane which is parallel with the drawing paper, because all the leaf springs 2a, 2b, 2c and 2d are normal to the imaginary plane which is parallel with the drawing paper.

FIG. 1(B) and FIG. 1(C) each shows an actual appearance when the 2-D suspension shown in FIG. 1(A) is bent by an external force F. FIG. 1(A) shows the case that angles of $\theta_1$ and $\theta_2$ are opposite in their signs to each other. In this case, when an external force F acts in the horizontal direction in the drawing (FIG. 1(B)), both the RPLSs are bent similarly. And when an external force F acts toward the vertical direction in the drawing (FIG. 1(C)), the first and the second RPLSs are bent oppositely to each other.

A compliance $C_0$ of the 2-D suspension shown in FIG. 1(A) about the external force F which acts on the movable body 3 can be expressed as:

$$C_0 = C_1 \cdot \cos^2(\theta_0 - \theta_1) + C_2 \cdot \cos^2(\theta_0 - \theta_2) \tag{1}$$

where $C_1$ and $C_2$ are compliances of the first and the second RPLSs about directions of X and Y, respectively, $\theta_0$ is the angle of the external force F with respect to the normal vector n of the rigid wall 4. If $C_1 = C_2 = C_r$ and $\theta_1 - \theta_2 = \pm \pi/2$, the equation (1) can be calculated as:

$$C_0 = C_r \tag{2}$$

The equation (2) means that the whole compliance of the 2-D suspension is independent of the direction in the plane parallel to the imaginary plane when both compliances of the first and second RPLSs are equal and the angle between a leaf spring of the first RPLS and a leaf spring of the second RPLS is a right angle. FIG. 2 shows an example of the 2-D suspension which is independent of the direction as described above.

Figure 3:
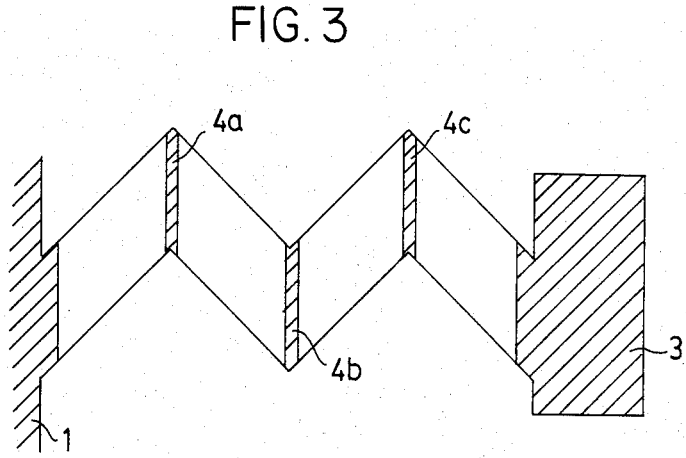

FIG. 3 shows still another embodiment of a 2-D suspension comprising four RPLSs linked in series by rigid walls 4a, 4b and 4c. This 2-D suspension can be smaller in height than the 2-D suspension comprising two RPLSs. Since the function of this 2-D suspension is theoretically the same as that shown in FIG. 1(A), further description thereof is omitted.

Figure 4:
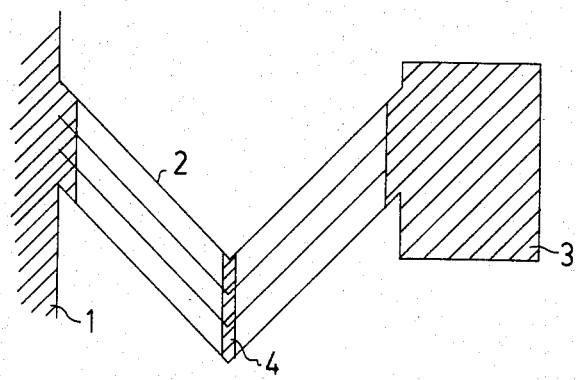

FIG. 4 shows a further embodiment of a 2-D suspension comprising two RPLSs. Either of these RPLSs comprises four leaf springs 2. In general, a compliance C of a cantilever whose cross section is rectangular is given by:

$$C = 4l^3/(Ebh^3)$$

where, E is the Young's modulus, l is the length, b is the width of the cross section and h is the height of the cross section. Since a leaf-spring 2 in a RPLS is fixed at its side, the compliance $C'$ of the leaf-spring 2 in the RPLS is given by:

$$C' = l^3/(Ebh^3)$$

Thus the compliance $C_r$ of the RPLS $$C_r = l^3/(NEbh^3) \tag{3}$$

where N is the number of leaf-springs employed in the RPLS. The equation (3) shows that h is in inverse proportion to $N^{\frac{1}{3}}$ when $C_r$, E, l and b are constant. Thus, in this case, the total cross section of the leaf-springs 2 is in proportion to $N^{\frac{2}{3}}$. Since the strength and the thermal conduction of a RPLS are in proportion to the total cross section, the RPLS shown in FIG. 4 is useful when it must be strengthened or when the movable body includes a heat source which must be sunk.

Figure 5:
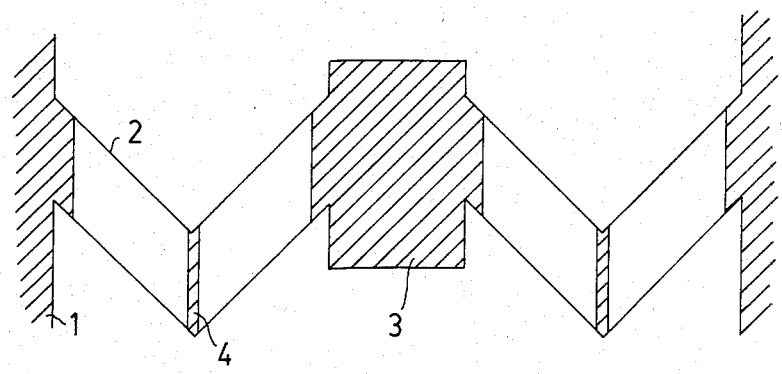

FIG. 5 shows a still further embodiment of a 2-D suspension holding the movable body at both sides thereof in symmetry. When imaginary planes of the series of RPLSs are parallel with each other, they do not restrict each other, because a series of RPLS translates the movable body in a plane which is not curved. In this case, the center of the holding force coincides with the center of gravity, so that little torque occurs between the holding force and the force of inertia. Thus the 2-D suspension in FIG. 5 can perform with high stability.

Figure 6A:
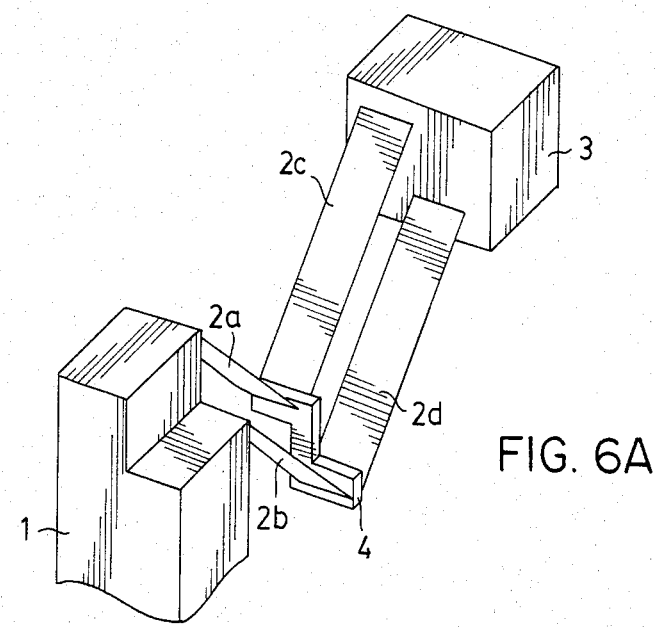
FIGS. 6(A) and 6(B) show isometric views of further embodiments of 2-D suspensions of the present invention.
Figure 6B:
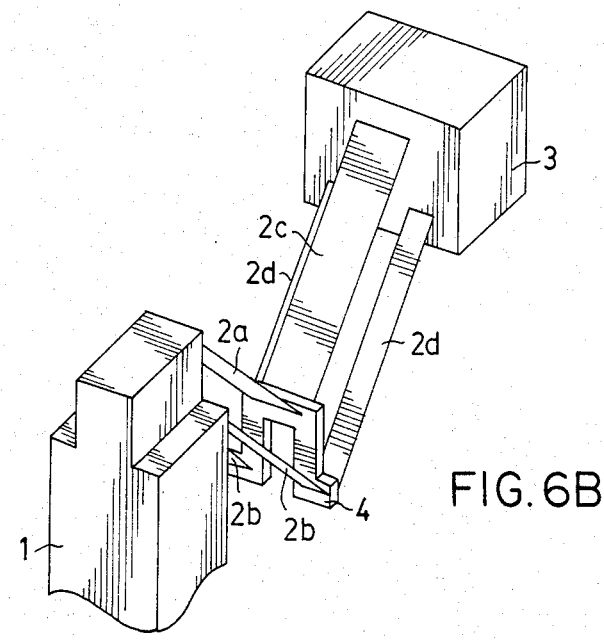

FIG. 6(A) shows a yet further embodiment of a 2-D suspension comprising two RPLSs. Either of these RPLSs in FIG. 6(A) comprises two leaf springs. These leaf springs do not overlap with each other from the view perpendicular to these leaf springs. FIG. 6(B) shows a modification of FIG. 6(A). In this case, each of leaf springs 2b and 2d in FIG. 6(A) is divided in two pieces in order to be symmetric. In these cases, the 2-D suspension can be easily molded by a metal mold which consist of two pieces. It is needless to say that leaf springs 2a and 2c in FIG. 6(A) may be divided instead of leaf springs 2b and 2d.

In this way, the 2-D suspension for a movable body of the invention which translates in a plane can accomplish little mechanical resonance, high strength, high thermal conductivity and high stability. Especially, the 2-D suspension of the invention is useful for an optical information read head because the tracking control system generally needs an actuator which moves the movable body in two-dimensional translation with little resonance and high stability.

Figure 7:
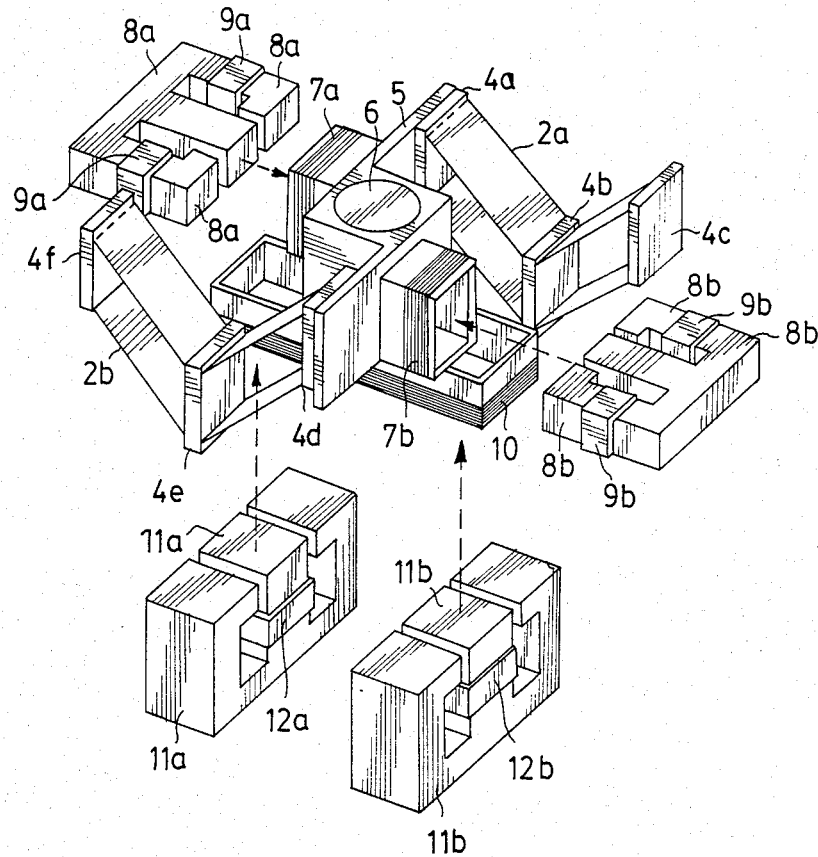
FIG. 7 shows an exploded perspective view of an embodiment of the present invention applied in an actuator of an optical information read head.

An example of an actuator in an optical information read head employing a 2-D suspension of the present invention is shown in FIG. 7. This actuator translates a focussing lens 6 which focuses a read out light spot on an information track of an information carrier. The focussing lens 6 is held in a lens holder 5 on which tracking coils 7a and 7b and a focussing coil 10 are attached. The movable body consists of the focussing lens 6, the lens holder 5, the tracking coils 7a and 7b and the focussing coil 10. The movable body is suspended by the 2-D suspension which consists of two pairs of RPLSs. A pair of RPLSs consists of leaf-springs 2a and rigid walls 4a, 4b and 4c. The other pair of RPLSs consists of leaf-springs 2b and rigid walls 4d, 4e and 4f. The rigid walls 4a and 4d are attached on the lens holder 5 and the rigid walls 4c and 4f are held by a fixing block (not shown in the drawing). The tracking coil 7a is put in the air gap of the magnetic circuit comprising magnetic yokes 8a and magnets 9a. The other tracking coil 7b is put in the air gap of the magnetic circuit comprising magnetic yokes 8b and magnets 9b. The tracking coils 7a and 7b drive the movable body with the aid of the magnetic circuits. The focussing coil 10 is put in air gaps of two magnetic circuits comprising magnetic yokes 11a or 11b and a magnet 12a or 12b in order to drive the movable body in the focussing direction. The 2-D suspension in FIG. 7 permits the movable body to translate in a plane parallel to the tracking direction and focussing direction, and other motions are restricted.

Since this actuator is constructed in rotation symmetry around the optical axis of the focussing lens, it can perform with high stability. Also, the stability of the actuator will be improved if the actuator is constructed in plane symmetry. Further, the actuator is more stable if it is both rotation symmetric and plane symmetric.

Although we have shown and described several embodiments of the present invention, it is to be clearly understood that various changes, modifications and other alterations may be made without departing from the present invention.

What is claimed is:

1. A focus lens system used for an optical disc recording/reproducing apparatus comprising:
   a focus lens;
   a holder means for mounting therein the focus lens;
   drive means for producing a force to move said focus lens holder means; and
   a pair of suspension spring means for suspending said focus lens holder means;
   wherein each of said pair of suspension spring means includes:
   a plurality of first leaf springs having a first length fixed at one end to a surface of a first rigid wall at a first fixing angle and at the other end to a surface of a second rigid wall at a second fixing angle;
   a plurality of second leaf springs having a second length fixed at one end to the other surface of said second rigid wall at a third fixing angle and at the other end to a surface of a third rigid wall at a fourth fixing angle;
   said pluralities of first and second leaf springs forming an oblique angle with the second rigid wall;
   a fourth rigid wall being fixed to said focus lens holder means; and
   two fixing blocks being disposed at both sides of said focus lens holder means and having said pair of suspension spring means respectively fixed thereto.

2. The focus lens system according to claim 1, wherein said drive means comprises:
   a first coil means, fixed to said focus lens holder means, for producing a horizontal drive force,
   a first magnetic circuit means for supplying a magnetic flux to said first coil means,
   a second coil means, fixed to said focus lens holder means, for producing a vertical drive force, and
   a second magnetic circuit means for supplying a magnetic flux to said second coil means.

* * * * *